United States Patent [19]

Künstle et al.

[11] 4,280,449

[45] Jul. 28, 1981

[54] STEAM GENERATOR FOR A SOLAR POWER PLANT

[75] Inventors: Konrad Künstle, Röttenbach; Kurt Reiter; Christian Koch, both of Erlangen, all of Fed. Rep. of Germany

[73] Assignee: Kraftwerk Union Aktiengesellschaft, Mülheim, Fed. Rep. of Germany

[21] Appl. No.: 64,754

[22] Filed: Aug. 8, 1979

[30] Foreign Application Priority Data

Aug. 16, 1978 [DE] Fed. Rep. of Germany ....... 2835702

[51] Int. Cl.³ .............................................. B09B 3/00
[52] U.S. Cl. ..................................... 122/4 R; 126/427
[58] Field of Search ....................... 122/4 R; 126/427

[56] References Cited

FOREIGN PATENT DOCUMENTS 2654125 1/1978 Fed. Rep. of Germany .
2736007 2/1979 Fed. Rep. of Germany ........... 126/427

Primary Examiner—Edward G. Favors
Attorney, Agent, or Firm—Herbert L. Lerner

[57] ABSTRACT

Steam generator for a solar power plant, with an evaporator heating surface having a front side exposable to focused sun rays and a rear side adjacent a chamber, and burner means for supplying at least part of the heat required by the steam generator, the burner including a sintered-block slab operating as a reformed-gas generator, a burner plate disposed downstream of the sintered-block slab in flow direction of the gas, the burner plate being disposed immediately adjacent the rear side of the evaporator heating surface, and an air-permeable further heating surface for the steam generator disposed between the sintered-block slab and the burner plate.

2 Claims, 1 Drawing Figure

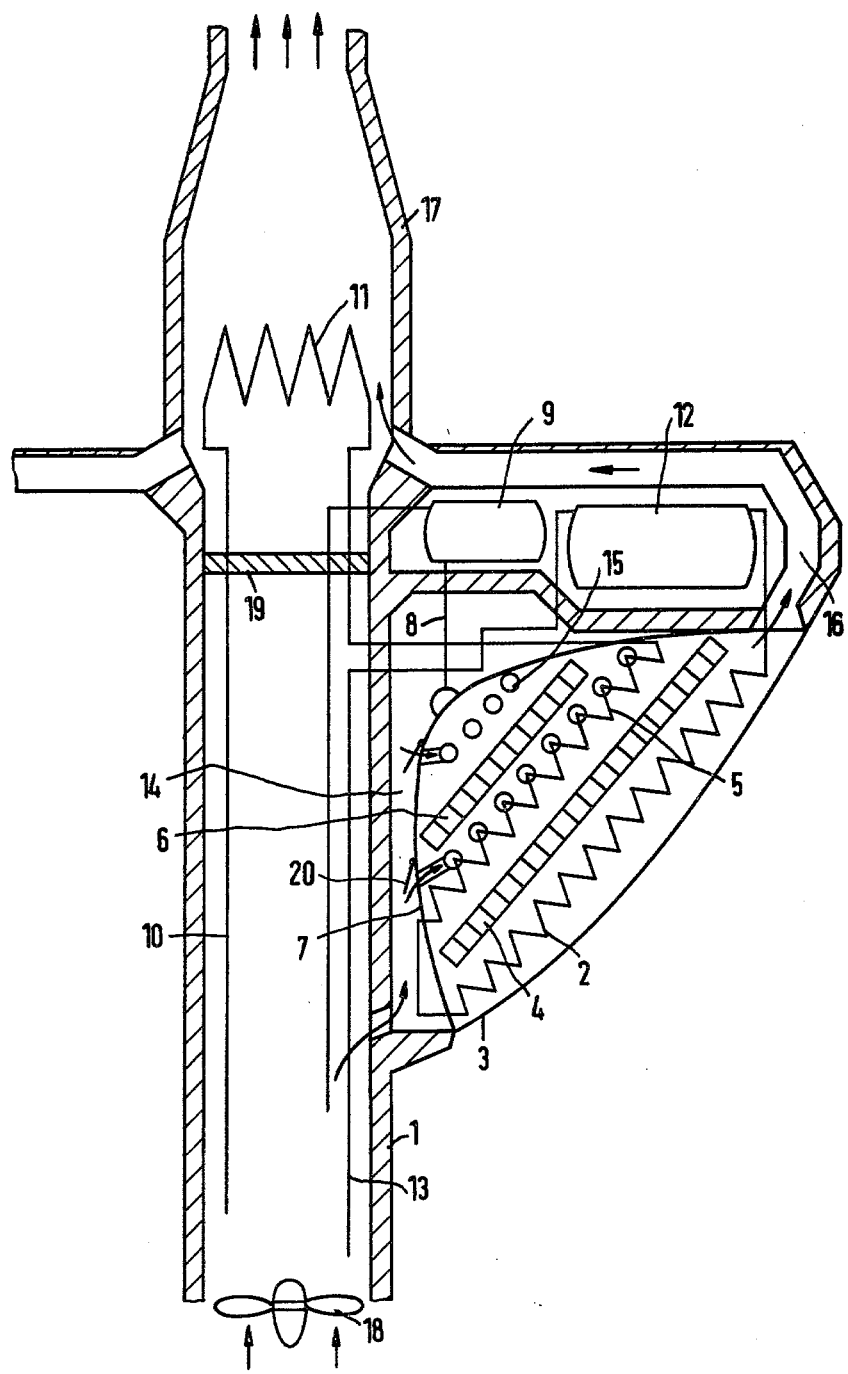

STEAM GENERATOR FOR A SOLAR POWER PLANT

The invention relates to a steam generator for a solar power plant with an evaporator heating surface which is exposed on one side to focused sun rays and the rear of which adjoins a chamber equipped with a burner for supplemental or substitute heating.

Such a steam generator is known from German Published, non-Prosecuted Application No. 26 54 125. In that publication a tower is provided which is irradiated with fucused sun light through deflection mirrors at an angle from below. The evaporator heating surface of the steam generator is disposed between a heat-insulating glass plate and a rear wall of the chamber. Behind the evaporator heating surface, there is a combustion chamber which contains a burner for fossil fuel. Be means of this burner, supplemental heating can be provided if the incidence of sun light is weak, or exclusive operation of the steam generator without solar energy may be carried on. The supplemental heating output is, however, limited in this construction.

It is accordingly an object of the invention to provide a steam generator for a solar power plant which overcomes the hereinfore mentioned disadvantages of the heretofore known devices of this general type, and in which the evaporator heating surface can give off power comparable to solar irradiation if the steam generator is operated with predominantly fossil fuel.

With the foregoing and other objects in view, there is provided, in accordance with the invention, a steam generator for a solar power plant, with an evaporator heating surface having a front side exposable to focused sun rays and a rear side adjacent a chamber, and burner means for supplying at least part of the heat required by the steam generator, the burner comprising a radiation burner having a sintered-block slab operating as a reformed-gas generator, a burner plate disposed down stream of the sintered-block slab in flow direction of the gas, the burner plate being disposed immediately adjacent the rear side of the evaporator heating surface, and an air-permeable further heating surface for the steam generator disposed between the sintered-block slab and the burner plate.

A radiation burner with a burner plate and a sintered-block slab preceding the burner plate, in the flow direction of the fuel gas as a reformed-gas generator, is known from German Pat. No. 22 60 586. In that patent, the hydro-carbons to be burned are mixed with air in front of a sintered-block slab having a multiplicity of capillary openings and are catalytically converted into reformed gas in the sintered-block slab. Between the sintered-block slab and a following burner plate, which is likewise provided with a multiplicity of passage canals, a mixing chamber for admixing secondary air to the reformed gases if provided, whereby the sintered-block slab, acting as a reformed-gas generator is shielded from the hot burner plate.

In the invention of the Instant Application, the high radiation intensity of a burner plate preceded by a reformed-gas generator is utilized on the one hand to generate a radiation density for the evaporator heating surface similar to the radiation density of solar radiation. On the other hand, a further heating surface is disposed between the reformed-gas generator and the burner plate, for preheating the water to be evaporated and for simultaneously cooling the sintered-block slab for the reformed-gas generator.

In accordance with a concomitant feature of the invention, there is provided a housing in which the sintered-block slab, burner plate, further heating surface and evaporator heating surface are disposed, the housing having rows of access openings formed therein, a fuel tank and a line connected from the housing to the fuel tank.

Other features which are considered as characteristic for the invention are set forth in the appended claims.

Although the invention is illustrated and described herein as embodied in Steam Generator for a Solar Power Plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings or the single FIGURE of the drawing which is a digrammatic cross-sectional view of the steam generator according to the invention.

Referring now particularly to the single FIGURE of the drawing, it is seen that a steam generator is disposed on a tower 1 and an evaporator heating surface 2 is located behind a glass plate 3, through which sun light is radiated at an angle from below, focused by non-illustrated deflection mirrors. On the rear side of the evaporator heating surface 2, which is on the side opposite the glass plate 3, there is a burner plate 4 which has approximately the same dimensions as the evaporator heating surface 2. The burner plate 4 is provided with passage openings, in which reformed gas from the sintered-block slab 6 and secondary air from vane 20 is mixed. Behind the burner plate 4 is disposed a further heating surface 5 of the steam generator, which precedes the evaporator heating surface 2 and can be used selectively for heating the feed water for evaporating the same. Adjacent thereto, in the sintered-block slab 6, a mixture of air and oil is converted catalytically into reformed gas. The entire hereinafore-described structure is located in a housing or chamber which extends up to the glass plate 3 and is connected through a line 8 to a tank 9 for fossil fuel.

The feed water flows from the lower end of the tower 1 through a feed line 10 into a preheater 11 which is disposed in a chimney 17 placed on the tower 1. As shown in the drawing from the preheater 11 it first travels into the heating surface 5 through the line shown and then into the evaporator heating surface 2 which is exposed to solar radiation. The evaporator heating surface 2 is followed, in flow direction, by a steam accumulator 12. A live steam line 13 leads from the steam accumulator 12 through the interior of the tower downward to a turbine which is not shown.

The combustion air is likewise drawn in from below through the interior of the tower 1 and flows in the direction of the arrows through an opening formed therein, into a space 14, which is adjacent the housing 7, on the outside thereof. In front of the sintered-block slab 6, and between the sintered-block slabs and the burner plate 4, the housing 7 is provided with primary-air access openings 15, through which air flows into the interior of the housing 7 as shown by the arrows. A vane 20 controls the air supply to the burner plate 4, in which the fuel gas generated in the sintered-block slab 6 burns slightly overstoichiometrically with the secondary air. The exhaust gases leave the housing 7 in the direction of the arrows through an exhaust gas canal 16 which opens below the preheater 11 into the chimney 17, placed on the tower 1. Through this contruction, the intensive radiation heat of the burner plate 4 is utilized toward both sides, so that with purely fossil operation of the steam generator, the same output can be produced as with full solar radiation, without additional heating surfaces. In case the air flow by natural draft is not sufficient, a blower 18 can be provided in the interior of the tower. A blocking plate 19 prevents the air from flowing from the lower part of the tower 1 directly into the chimney 17.

There are claimed:

1. Steam generator for a solar power plant, with an evaporator heating surface having a front side exposable to focused sun rays and a rear side adjacent a chamber, and burner means for supplying at least part of the heat required by the steam generator, said burner means comprising a sintered-block slab operating as a reformed-gas generator, a burner plate disposed downstream of said sintered-block slab in flow direction of the gas, said burner plate being disposed immediately adjacent said rear side of said evaporator heating surface, and an air-permeable further heating surface for the steam generator disposed between said sintered-block slab and said burner plate.

2. Steam generator according to claim 1, including a housing in which said sintered-block slab, burner plate, further heating surface and evaporator heating surface are disposed, said housing having rows of access openings formed therein, a fuel tank, and a line connected from said housing to said fuel tank.

* * * * *